US 12,541,946 B2

(12) United States Patent
Hunt

(10) Patent No.: US 12,541,946 B2
(45) Date of Patent: Feb. 3, 2026

(54) PRODUCING A DATA SET TO TRAIN A NEURAL NETWORK FOR OBJECT DETECTION

(71) Applicants: Denso International America, Inc., Southfield, MI (US); Denso Corporation, Kariya (JP)

(72) Inventor: Shawn Hunt, Bethel Park, PA (US)

(73) Assignees: Denso International America, Inc., Southfield, MI (US); Denso Corporation, Kariya (JP)

( * ) Notice: Subject to any disclaimer, the term of this patent is extended or adjusted under 35 U.S.C. 154(b) by 774 days.

(21) Appl. No.: 17/888,877

(22) Filed: Aug. 16, 2022

(65) Prior Publication Data

US 2023/0252759 A1 Aug. 10, 2023

Related U.S. Application Data

(60) Provisional application No. 63/307,222, filed on Feb. 7, 2022.

(51) Int. Cl.
*G06V 10/75* (2022.01)
*G06N 3/08* (2023.01)
(Continued)

(52) U.S. Cl.
CPC ............ *G06V 10/751* (2022.01); *G06V 10/82* (2022.01); *G06N 3/08* (2013.01); *G06N 3/084* (2013.01);
(Continued)

(58) Field of Classification Search
CPC .... G06V 10/751; G06V 10/82; G06V 10/774; G06V 20/58; G06N 3/084; G06N 3/08
See application file for complete search history.

(56) References Cited

U.S. PATENT DOCUMENTS

2015/0324658 A1 11/2015 Zhang et al.
2017/0372164 A1* 12/2017 Kant .................... G06V 20/586
(Continued)

FOREIGN PATENT DOCUMENTS

CN 112529917 A * 3/2021 ............. G06N 3/045

OTHER PUBLICATIONS

Erhan et al., (NPL "Scalable Object Detection using Deep Neural Networks" Published 2014 By IEEE (Total 8 Pages) (Year: 2014).*
(Continued)

*Primary Examiner* — Quoc A Tran
(74) *Attorney, Agent, or Firm* — Christopher G. Darrow; Darrow Mustafa PC

(57) ABSTRACT

A system for producing a data set to train a neural network for object detection can include a processor and a memory. The memory can store an object detection module and a data set determination module. The object detection module can include instructions that cause the processor to: (1) cause the neural network to determine, from data, produced by a ranging sensor system, a first set of objects and (2) cause another object detection system to determine, from the data, a second set of objects. The data set determination module can include instructions that cause the processor to: (2) compare a first count, of objects in the first set, and a second count, of objects in the second set and (2) designate, in response to the first count being different from the second count, the second set as the data set to train the neural network for object detection.

20 Claims, 6 Drawing Sheets

(51) Int. Cl.
  G06N 3/084    (2023.01)
  G06V 10/774   (2022.01)
  G06V 10/82    (2022.01)
  G06V 20/58    (2022.01)

(52) U.S. Cl.
  CPC ........... G06T 2207/20081 (2013.01); G06T 2207/20084 (2013.01); G06V 10/774 (2022.01); G06V 20/58 (2022.01)

(56) References Cited

U.S. PATENT DOCUMENTS

| | | | |
|---|---|---|---|
| 2021/0001891 | A1 | 1/2021 | Majithia |
| 2021/0374421 | A1* | 12/2021 | Chakraborty .......... G06V 10/75 |
| 2022/0383640 | A1* | 12/2022 | Vora ....................... G06V 10/40 |

OTHER PUBLICATIONS

Meyer et al., "LaserNet: An Efficient Probabilistic 3D Object Detector for Autonomous Driving," Proceedings of the IEEE/CVF Conference on Computer Vision and Pattern Recognition (CVPR), 2019, pp. 12677-12686.
He et al., "Structure Aware Single-Stage 3D Object Detection from Point Cloud," Proceedings of the IEEE/CVF Conference on Computer Vision and Pattern Recognition (CVPR), 2020, pp. 11873-11882.
Lang et al., "PointPillars: Fast Encoders for Object Detection from Point Clouds," Proceedings of the IEEE/CVF Conference on Computer Vision and Pattern Recognition (CVPR), 2019, pp. 12697-12705.
Rusu, "Semantic 3D Object Maps for Everyday Manipulation in Human Living Environments," Kunstl Intell, vol. 24, Chapter 6 and Appendix A, Nov. 2010, 40 pages.

* cited by examiner

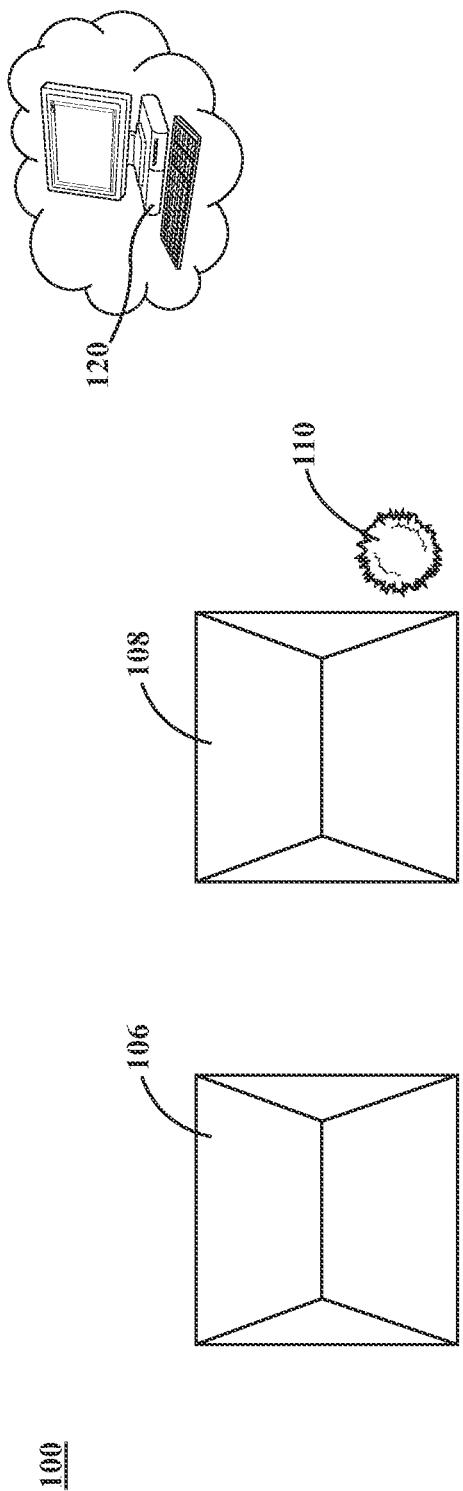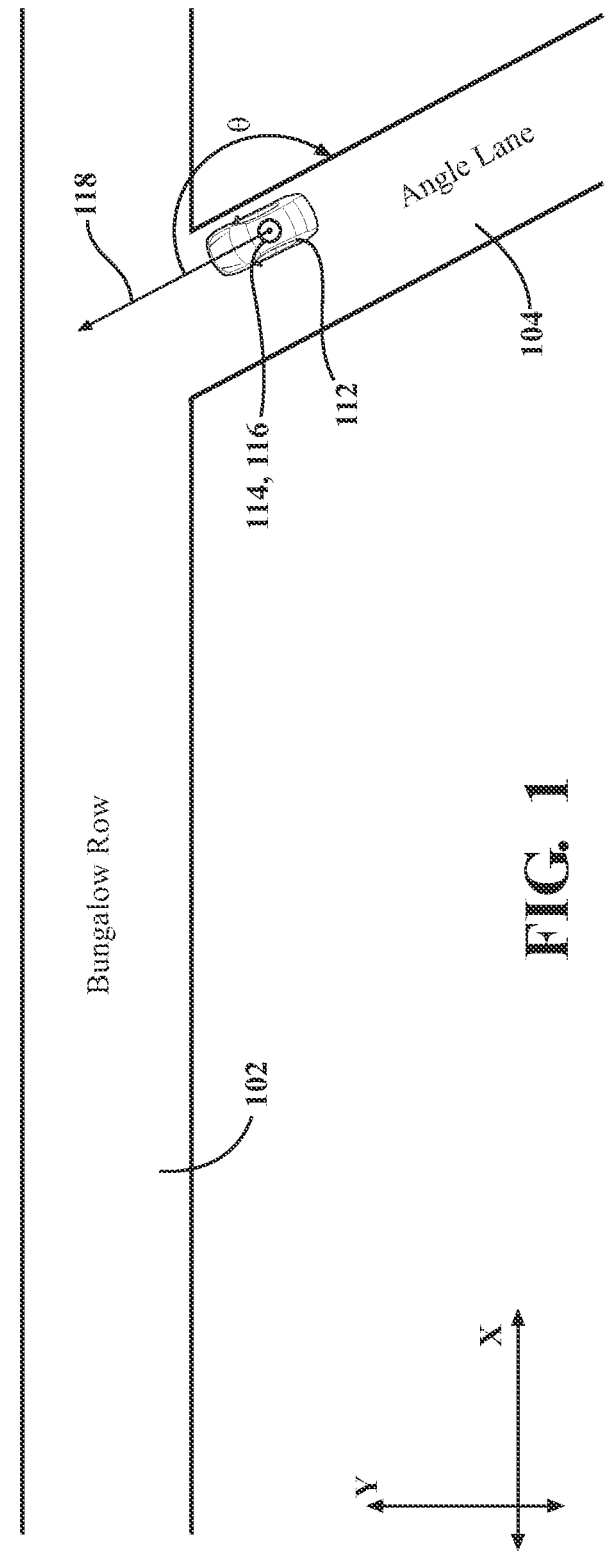
FIG. 1

400

| | Point #1 | | Point #2 | | Point #3 | | Point #4 | | Point #5 | |
|---|---|---|---|---|---|---|---|---|---|---|
| 402 → | ρ | ∞ | ρ | ∞ | ρ | ∞ | ρ | ∞ | ρ | ∞ |
| 404 → | φ | 316° | φ | 318° | φ | 320° | φ | 322° | φ | 324° |
| 406 → | z | 7.0m | z | 7.0m | z | 7.1m | z | 7.0m | z | 7.0m |
| 408 → | channel | 1 | channel | 1 | channel | 1 | channel | 1 | channel | 1 |

| | Point #6 | | Point #7 | | Point #8 | | Point #9 | | Point #10 | |
|---|---|---|---|---|---|---|---|---|---|---|
| | ρ | ∞ | ρ | ∞ | ρ | ∞ | ρ | ∞ | ρ | ∞ |
| | φ | 326° | φ | 328° | φ | 330° | φ | 332° | φ | 334° |
| | z | 6.9m | z | 7.0m | z | 7.0m | z | 7.0m | z | 7.0m |
| | channel | 1 | channel | 1 | channel | 1 | channel | 1 | channel | 1 |

| | Point #11 | | Point #12 | | Point #13 | | Point #14 | | Point #15 | |
|---|---|---|---|---|---|---|---|---|---|---|
| | ρ | ∞ | ρ | ∞ | ρ | ∞ | ρ | ∞ | ρ | ∞ |
| | φ | 336° | φ | 338° | φ | 340° | φ | 342° | φ | 344° |
| | z | 7.0m | z | 7.2m | z | 7.0m | z | 7.0m | z | 7.0m |
| | channel | 1 | channel | 1 | channel | 1 | channel | 1 | channel | 1 |

| | Point #16 | | Point #17 | | Point #18 | | Point #19 | | Point #20 | |
|---|---|---|---|---|---|---|---|---|---|---|
| | ρ | ∞ | ρ | ∞ | ρ | ∞ | ρ | ∞ | ρ | ∞ |
| | φ | 346° | φ | 348° | φ | 350° | φ | 352° | φ | 354° |
| | z | 7.0m | z | 7.0m | z | 7.0m | z | 6.9m | z | 7.0m |
| | channel | 1 | channel | 1 | channel | 1 | channel | 1 | channel | 1 |

| | Point #21 | | Point #22 | | Point #23 | | Point #24 | | Point #25 | |
|---|---|---|---|---|---|---|---|---|---|---|
| | ρ | 52.5m | ρ | 45.0m | ρ | 40.5m | ρ | 39.0m | ρ | 40.4m |
| | φ | 316° | φ | 318° | φ | 320° | φ | 322° | φ | 324° |
| | z | 1.9m | z | 2.0m | z | 2.1m | z | 2.0m | z | 2.0m |
| | channel | 2 | channel | 2 | channel | 2 | channel | 2 | channel | 2 |

| | Point #26 | | Point #27 | | Point #28 | | Point #29 | | Point #30 | |
|---|---|---|---|---|---|---|---|---|---|---|
| | ρ | 40.6m | ρ | 29.0m | ρ | 28.2m | ρ | 26.4m | ρ | 24.9m |
| | φ | 326° | φ | 328° | φ | 330° | φ | 332° | φ | 334° |
| | z | 2.0m | z | 2.1m | z | 2.0m | z | 2.0m | z | 2.0m |
| | channel | 2 | channel | 2 | channel | 2 | channel | 2 | channel | 2 |

| | Point #31 | | Point #32 | | Point #33 | | Point #34 | | Point #35 | |
|---|---|---|---|---|---|---|---|---|---|---|
| | ρ | 23.4m | ρ | 22.5m | ρ | 21.3m | ρ | 21.0m | ρ | 21.6m |
| | φ | 336° | φ | 338° | φ | 340° | φ | 342° | φ | 344° |
| | z | 2.0m | z | 2.0m | z | 2.0m | z | 2.0m | z | 2.0m |
| | channel | 2 | channel | 2 | channel | 2 | channel | 2 | channel | 2 |

| Point #36 | |
|---|---|
| ρ | 22.5m |
| φ | 346° |
| z | 2.0m |
| channel | 2 |

| Point #37 | |
|---|---|
| ρ | 20.7m |
| φ | 348° |
| z | 2.1m |
| channel | 2 |

| Point #38 | |
|---|---|
| ρ | 20.4 |
| φ | 350° |
| z | 2.0m |
| channel | 2 |

| Point #39 | |
|---|---|
| ρ | 27.3m |
| φ | 352° |
| z | 2.0m |
| channel | 2 |

| Point #40 | |
|---|---|
| ρ | 28.8m |
| φ | 354° |
| z | 1.9m |
| channel | 2 |

| Point #41 | |
|---|---|
| ρ | 51.9m |
| φ | 316° |
| z | 0.0m |
| channel | 3 |

| Point #42 | |
|---|---|
| ρ | 44.5m |
| φ | 318° |
| z | 0.0m |
| channel | 3 |

| Point #43 | |
|---|---|
| ρ | 40.1m |
| φ | 320° |
| z | 0.0m |
| channel | 3 |

| Point #44 | |
|---|---|
| ρ | 37.2m |
| φ | 322° |
| z | 0.0m |
| channel | 3 |

| Point #45 | |
|---|---|
| ρ | 34.3m |
| φ | 334° |
| z | 0.0m |
| channel | 3 |

| Point #46 | |
|---|---|
| ρ | 31.4m |
| φ | 326° |
| z | 0.0m |
| channel | 3 |

| Point #47 | |
|---|---|
| ρ | 28.5m |
| φ | 328° |
| z | 0.0m |
| channel | 3 |

| Point #48 | |
|---|---|
| ρ | 27.7m |
| φ | 330° |
| z | 0.1m |
| channel | 3 |

| Point #49 | |
|---|---|
| ρ | 26.2m |
| φ | 332° |
| z | 0.0m |
| channel | 3 |

| Point #50 | |
|---|---|
| ρ | 24.7m |
| φ | 334° |
| z | 0.0m |
| channel | 3 |

| Point #51 | |
|---|---|
| ρ | 23.3m |
| φ | 336° |
| z | 0.0m |
| channel | 3 |

| Point #52 | |
|---|---|
| ρ | 22.4m |
| φ | 338° |
| z | 0.0m |
| channel | 3 |

| Point #53 | |
|---|---|
| ρ | 21.3m |
| φ | 340° |
| z | 0.0m |
| channel | 3 |

| Point #54 | |
|---|---|
| ρ | 20.2m |
| φ | 342° |
| z | 0.1m |
| channel | 3 |

| Point #55 | |
|---|---|
| ρ | 19.0m |
| φ | 344° |
| z | 0.0m |
| channel | 3 |

| Point #56 | |
|---|---|
| ρ | 17.9m |
| φ | 346° |
| z | 0.0m |
| channel | 3 |

| Point #57 | |
|---|---|
| ρ | 16.8m |
| φ | 348° |
| z | 0.0m |
| channel | 3 |

| Point #58 | |
|---|---|
| ρ | 15.7m |
| φ | 350° |
| z | 0.0m |
| channel | 3 |

| Point #59 | |
|---|---|
| ρ | 14.6m |
| φ | 352° |
| z | 0.0m |
| channel | 3 |

| Point #60 | |
|---|---|
| ρ | 13.5m |
| φ | 354° |
| z | 0.0m |
| channel | 3 |

FIG. 4B

PRODUCING A DATA SET TO TRAIN A NEURAL NETWORK FOR OBJECT DETECTION

CROSS-REFERENCE TO RELATED APPLICATIONS

This application claims the benefit of U.S. Provisional Application No. 63/307,222, filed Feb. 7, 2022, the contents of which are incorporated herein in their entirety by reference.

TECHNICAL FIELD

The disclosed technologies are directed to producing a data set to train a neural network for object detection.

BACKGROUND

A neural network can be a computing system configured to perform a task using an approach modeled upon a manner in which a brain processes information through neurons. An artificial neuron, also referred to as a node, can be a basic element of the neural network. The node can be configured to receive one or more inputs and to produce an output of a function. Each of the one or more inputs can be multiplied by a value of a weight to produce a weighted input. A sum of weighted inputs can be an argument of the function of the node. The neural network can have nodes arranged in a sequence of one or more layers. Each layer can have one or more nodes. An input layer can receive one or more inputs related to the task to be performed by the neural network. One or more intermediate layers, also referred to as hidden layers, can receive one or more outputs from the input layer. An output layer can receive one or more outputs from the one or more hidden layers and can produce one or more outputs related to the task. If the task is abstract, then the neural network can be configured so that elementary aspects of the task are performed by nodes of hidden layers early in the sequence with increasingly abstract aspects of the task performed by nodes of hidden layers later in the sequence.

The neural network can be trained to minimize an error, also referred to as a loss function, associated with the one or more outputs related to the task. The neural network can receive, for training, a data set related to the task and can produce training outputs related to the task. A value of the loss function can be calculated. The neural network can be trained in different manners including, for example, supervised, unsupervised, or self-supervised. If the neural network is trained in a supervised manner, then the value of the loss function can correspond to a difference between values of the training outputs and values of expected outputs of the neural network in response to a receipt of the data set. The values of the expected outputs can be referred to as the ground truth. If the neural network is trained in an unsupervised manner, then the value of the loss function can correspond to a difference between values of the data set and values of inputs reconstructed from the values of the training outputs. If the neural network is trained in a self-supervised manner, then the value of the loss function can correspond to a difference between results of similar processes performed on similar inputs.

SUMMARY

In an embodiment, a system for producing a data set to train a neural network for object detection can include a processor and a memory. The memory can store an object detection module and a data set determination module. The object detection module can include instructions that cause the processor to: (1) cause the neural network to determine, from data, produced by a ranging sensor system, a first set of objects and (2) cause another object detection system to determine, from the data, a second set of objects. The data set determination module can include instructions that cause the processor to: (2) compare a first count, of objects in the first set, and a second count, of objects in the second set and (2) designate, in response to the first count being different from the second count, the second set as the data set to train the neural network for object detection.

In another embodiment, a method for producing a data set to train a neural network for object detection can include causing, by a processor, the neural network to determine, from data, produced by a ranging sensor system, a first set of objects. The method can include causing, by the processor, another object detection system to determine, from the data, produced by the ranging sensor system, a second set of objects. The method can include comparing, by the processor, a first count, of objects in the first set, and a second count, of objects in the second set. The method can include designating, by the processor and in response to the first count being different from the second count, the second set as the data set to train the neural network for object detection.

In another embodiment, a non-transitory computer-readable medium for producing a data set to train a neural network for object detection can include instructions that, when executed by one or more processors, cause the one or more processors to cause a neural network to determine, from data, produced by a ranging sensor system, a first set of objects. The non-transitory computer-readable medium can also include instructions that, when executed by one or more processors, cause the one or more processors to cause another object detection system to determine, from the data, a second set of objects. The non-transitory computer-readable medium can also include instructions that, when executed by one or more processors, cause the one or more processors to compare a first count, of objects in the first set, and a second count, of objects in the second set. The non-transitory computer-readable medium can also include instructions that, when executed by one or more processors, cause the one or more processors to designate, in response to the first count being different from the second count, the second set as a data set to train the neural network for object detection.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 1 includes a diagram that illustrates an example of an environment for producing a data set to train a neural network for object detection, according to the disclosed technologies.

FIGS. 4A and 4B include a set of tables that illustrate an example a set of data produced by a ranging sensor system, according to the disclosed technologies.

DETAILED DESCRIPTION

Figure 2:
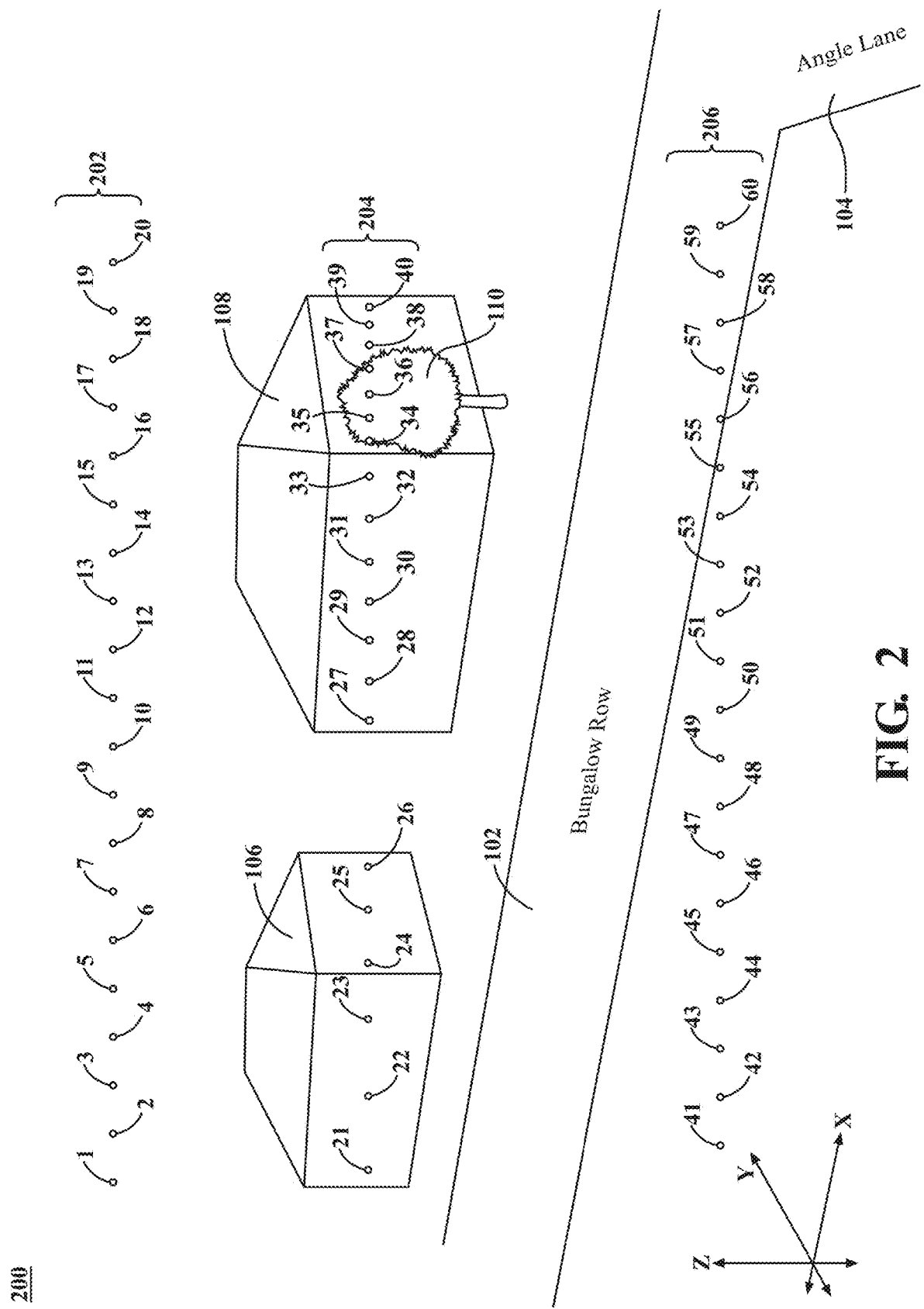
FIG. 2 includes a diagram that illustrates an example of points of readings, from a multi-line lidar device, of the environment, according to the disclosed technologies.

The disclosed technologies are directed to producing a data set to train a neural network for object detection. A neural network can be caused, by a system of the disclosed technologies, to determine, from data, produced by a ranging sensor system, a first set of objects. For example, the ranging sensor system can include one or more of a lidar device, a radar device, an ultrasonic ranging device, an infrared ranging device, or the like. For example, the lidar device can include a multi-line lidar device. For example, the data, produced by the ranging sensor system, can include point cloud data. For example, the neural network can include a self-supervised neural network. Another object detection system can be caused, by the system of the disclosed technologies, to determine, from the data, a second set of objects. For example, the other object detection system can be configured to operate in a manner that excludes a performance of a function by an artificial neuron. That is, the other object detection system can exclude a neural network. For example, the other object detection system can be configured to operate in a manner that includes a performance of functions that detect objects using a clustering technique. For example, the clustering technique can include a three-dimensional Euclidean clustering technique. A first count, of objects in the first set, and a second count, of objects in the second set, can be compared by the system of the disclosed technologies. In response to the first count being different from the second count, the second set can be designated, by the system of the disclosed technologies, as a data set to train the neural network for object detection.

For example, operations of a system of the disclosed technologies can be performed by a perception system of a cyber-physical system. The cyber-physical system can be a component of another system. The other system can include one or more of a medical monitoring system, an electrical grid monitoring system, an industrial control system, a robotics system, an automated vehicle, or the like. For example, the automated vehicle can include an autonomous vehicle.

For example, one or more of information about the first set of objects or information about the second set of objects can be caused, by a system of the disclosed technologies, to be conveyed to a controller system of the cyber-physical system. For example, the controller system can be configured to use the one or more of the information about the first set of objects or the information about the second set of objects to determine an action to be performed by the other system. The action can be associated with a principal purpose of the other system. For example, if the other system is an autonomous vehicle, then the action can be a determination of a trajectory for the autonomous vehicle.

For example, a system of the disclosed technologies can be configured to perform the operations in iterations. A duration of time of an iteration, of the iterations, can be less than or equal to one or more of: (1) a duration of time of an iteration of operations performed by the controller system or (2) a duration of time associated with a complete rotation of a ranging sensor of the ranging sensor system. For example, the data, produced by the ranging sensor system, can include a set of data. The set of data can include subsets. Data in a subset, of the subsets, can be associated with a reading of the ranging sensor system. In order for the system of the disclosed technologies to be configured to perform an iteration of the operations within the duration of time, one or more specific subsets, of the subsets, can be prevented, by the system of the disclosed technologies, from being included in a performance of the operations in the iteration.

For example, a system of the disclosed technologies can prevent the one or more specific subsets from being included in the performance of the operations in the iteration by: (1) determining that the reading is associated with a ground plane or a sky and (2) including, in the one or more specific subsets, the subset associated with the reading. That is, readings associated with the ground plane or the sky may not need to be included with readings needed to detect an object. Additionally or alternatively, for example, a system of the disclosed technologies can prevent the one or more specific subsets from being included in the performance of the operations in the iteration by: (1) defining a set of subsets of the subsets and (2) including, in the one or more specific subsets, a percentage of the subsets included in the set of subsets. The data in a subset can include a distance between a point, associated with the reading, and a ranging sensor of the ranging sensor system. The distance, included in each subset in the set of subsets, can be between a first threshold distance and a second threshold distance. A count of readings needed to detect an object at a specific distance can be a function of distances between the readings and the ranging sensor. That is, a count of readings needed to detect an object that is near to the ranging sensor may be less than a count of readings needed to detect an object that is far from the ranging sensor.

For example: (1) a first phase can be associated with a duration of time during which the neural network is being trained and (2) a second phase can be associated with a duration of time after the neural network has been trained. A system of the disclosed technologies can cause the one or more of the information about the first set of objects or the information about the second set of objects to be conveyed to the controller system by: (1) causing, during the first phase, the information about the second set of objects to be conveyed to the controller system, (2) preventing, during the first phase, the information about the first set of objects from being conveyed to the controller system, and (3) causing, during the second phase, the one or more of the information about the first set of objects or the information about the second set of objects to be conveyed to the controller system. In this manner, the information about the first set of objects, determined by the neural network, can be prevented from being conveyed to the controller system until the neural network has been trained.

FIG. 1 includes a diagram that illustrates an example of an environment 100 for producing a data set to train a neural network for object detection, according to the disclosed technologies. For example, the environment 100 can include a first road 102 (Bungalow Row) and a second road 104

(Angle Lane). For example, the environment 100 can include, along the first road 102, a first house 106 and a second house 108. For example, a tree 110 can be located near a side of the second house 108. For example, an automated vehicle 112 can be located on the second road 104. For example, a ranging sensor system 114 can be disposed on the automated vehicle 112. For example, the ranging sensor system 114 can include a multi-line lidar device 116. For example, the multi-line lidar device 116 can be configured to rotate in a clockwise direction to form a degree of angular rotation ($\varphi$) with respect to a ray 118. For example, the ray 118 can have an origin at a center of the multi-line lidar device 116 and can have a direction that corresponds to a straight, forward direction of a movement of the vehicle 112. For example, the environment 100 can include a server 120.

FIG. 2 includes a diagram that illustrates an example of points 200 of readings, from the multi-line lidar device 116, of the environment 100, according to the disclosed technologies. The points 200 can include, for example, Point #1 through Point #60. With reference to FIGS. 1 and 2, for example, the points 200 can be arrayed in a cylindrical coordinate system that has an origin at the center of the multi-line lidar device 116, a distance ($\rho$) between the multi-line lidar device 116 and a point of the points 200, the degree of angular rotation ($\varphi$) with respect to the ray 118, and a height (z) above a ground plane. For example: (1) Point #1 through Point #20 can be of readings associated with a first line 202 of the multi-line lidar device 116, (2) Point #21 through Point #40 can be of readings associated with a second line 204 of the multi-line lidar device 116, and (3) Point #41 through Point #60 can be of readings associated with a third line 206 of the multi-line lidar device 116.

Figure 3:
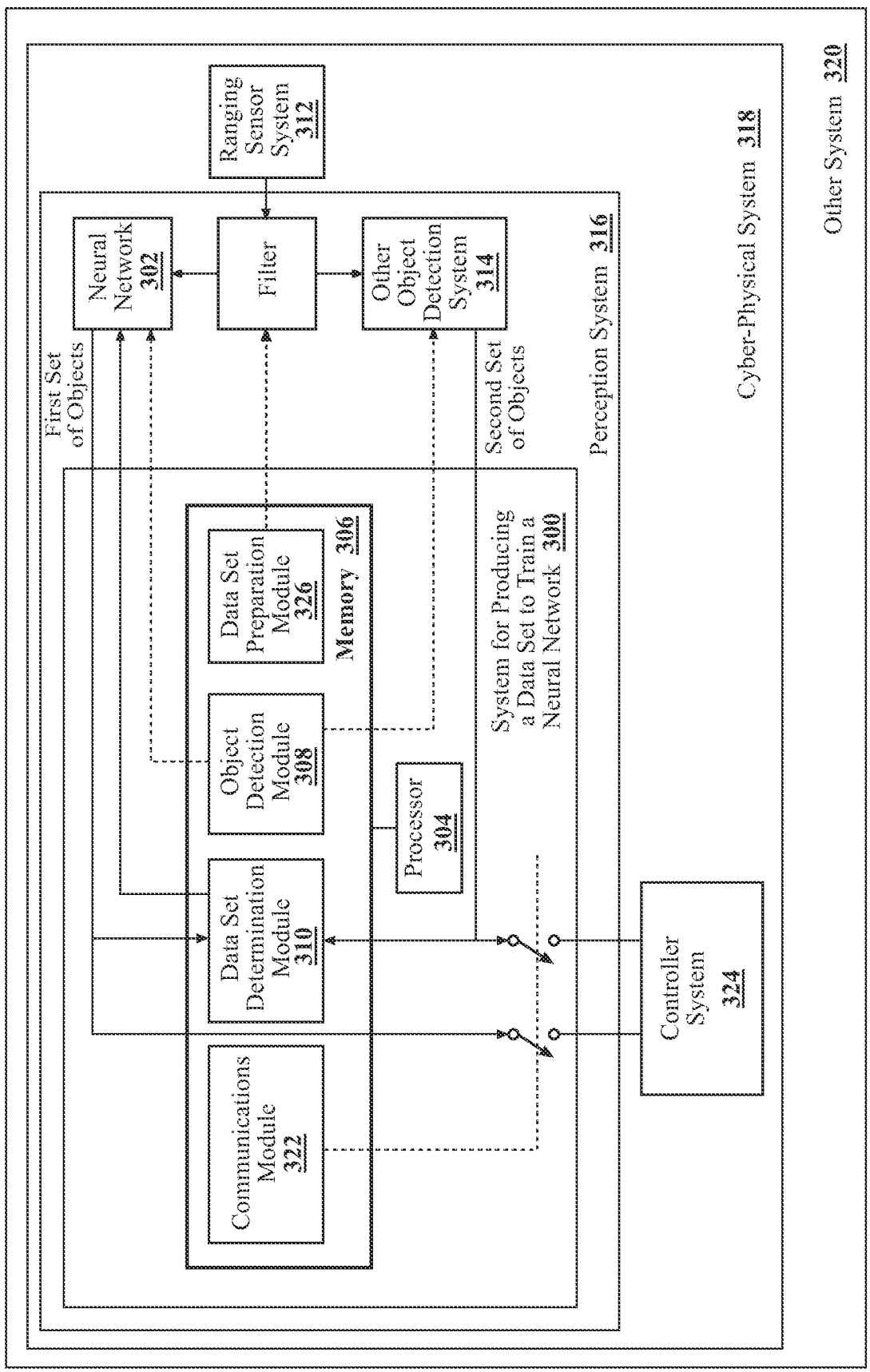
FIG. 3 includes a block diagram that illustrates an example of a system for producing a data set to train a neural network for object detection, according to the disclosed technologies.

FIG. 3 includes a block diagram that illustrates an example of a system 300 for producing a data set to train a neural network 302 for object detection, according to the disclosed technologies. The system 300 can include, for example, a processor 304 and a memory 306. The memory 306 can be communicably coupled to the processor 304. For example, the memory 306 can store an object detection module 308 and a data set determination module 310.

The object detection module 308 can include instructions that function to control the processor 304 to cause the neural network 302 to determine, from data, produced by a ranging sensor system 312, a first set of objects. The ranging sensor system 312 can include, for example, one or more of a lidar device, a radar device, an ultrasonic ranging device, an infrared ranging device, or the like. For example, the lidar device can include a multi-line lidar device. For example, the data, produced by the ranging sensor system 312, can include point cloud data.

The object detection module 308 can include instructions that function to control the processor 304 to cause another object detection system 314 to determine, from the data, produced by the ranging sensor system 312, a second set of objects. For example, the other object detection system 314 can be configured to operate in a manner that excludes a performance of a function by an artificial neuron. That is, the other object detection system can exclude a neural network. For example, the other object detection system 314 can be configured to operate in a manner that includes a performance of functions that detect objects using a clustering technique. For example, the clustering technique can include a three-dimensional Euclidean clustering technique.

In a first configuration, the instructions to cause the neural network 302 to determine the first set of objects can be configured to be performed in parallel with the instructions to cause the other object detection system 314 to determine the second set of objects.

The data set determination module 310 can include instructions that function to control the processor 304 to compare a first count, of objects in the first set, and a second count, of objects in the second set.

The data set determination module 310 can include instructions that function to control the processor 304 to designate, in response to the first count being different from the second count, the second set as the data set to train the neural network 302 for object detection. For example, the neural network 302 can include a self-supervised neural network.

In a second configuration, instructions of the system 300 can be configured to be performed by a perception system 316 of a cyber-physical system 318. A cyber-physical system can be a computer system configured to monitor and/or control a mechanism in a manner in which one or more interactions between the computer system and one or more physical elements of the mechanism can account for different behavioral modalities and/or different contexts. The cyber-physical system 318 can being a component of another system 320. For example, the other system 320 can include one or more of a medical monitoring system, an electrical grid monitoring system, an industrial control system, a robotics system, an automated vehicle, or the like. For example, the automated vehicle can include an autonomous vehicle. For example, the other system 320 can have a housing and at least a portion of the cyber-physical system 318 can be disposed within the housing. Alternatively, for example, the other system 320 can have a housing and at least a portion of the cyber-physical system 318 can be disposed outside of the housing.

With reference to FIGS. 1 and 3, for example, the other system 320 can be the automated vehicle 112. For example, at least a portion of the cyber-physical system 318 can be disposed within the automated vehicle 112. Alternatively, for example, at least a portion of the cyber-physical system 318 can be disposed within the server 120. For example, the ranging sensor system 312 can be the ranging sensor system 114. The system 300 can cause the neural network 302 to determine, from data, produced by the ranging sensor system 114, the first set of objects, which can include the first house 106 and the second house 108. The system 300 can cause the other object detection system 314 to determine, from data, produced by the ranging sensor system 114, the second set of objects, which can include the first house 106, the second house 108, and the tree 110. The system 300 can compare the first count, of the objects in the first set (i.e., 2), and the second count, of the objects in the second set (i.e., 3). The system 300 can designate, in response to the first count being different from the second count, the second set as the data set to train the neural network 302 for object detection. That is, because the neural network 302 did not determine that the tree 110 was an object (or determined that the tree 110 was part of an object that is the second house 108), the neural network 302 may need to be further trained.

Several open source data sets have been developed to train neural networks for object detection for use in a perception system of an automated vehicle. These open source data sets include, for example: (1) the KITTI Vision Benchmark Dataset, produced by Karlsruhe Institute of Technology and Toyota Technological Institute at Chicago, (2) the Waymo Open Dataset, produced by Waymo LLC of Mountain View, California, and (3) nuScenes, produced by Motional AD Inc. of Boston, Massachusetts. However, differences between parameters associated with a specific setup for a specific ranging sensor system disposed on a specific automated vehicle and parameters associated with productions of these open source data sets can cause neural networks, included in perception systems of such specific automated vehicles, but trained using these open source data sets to produce errors in object detection. For example, a type of a ranging sensor used by such a specific automated vehicle may be different from a type of a ranging sensor used to produce such open source data sets (e.g., the type of the ranging sensor used by the specific automated vehicle is a 128-line lidar device whereas the type of the ranging sensor used to produce such open source data sets was a 64-line lidar device). For example, a position, with respect to an environment, of a ranging sensor used by such a specific automated vehicle (e.g., a height above a ground plane) may be different from a position, with respect to the environment, of a ranging sensor used to produce such open source data sets (e.g., the specific automated vehicle is a sport utility vehicle whereas the vehicle used to produce such open source data sets was a sedan). The disclosed technologies address this deficiency by using one or more other object detection techniques to train neural networks, included in perception systems of such specific automated vehicles. In a situation in which object detection results produced by the one or more other object detection techniques are superior to object detection results produced by such neural networks, but object classification results produced by such neural networks are superior to object classification results produced by the one or more other object detection techniques, perception systems can perform both procedures until such neural networks have been trained to perform object detection at a degree of accuracy required by such specific automated vehicles. Thereafter, such neural networks can be used both for object detection and for object classification.

Returning to FIG. 3, in an implementation of the second configuration, the memory 306 can further store a communications module 322. The communications module 322 can include instructions that function to control the processor 304 to cause one or more of information about the first set of objects or information about the second set of objects to be conveyed to a controller system 324 of the cyber-physical system 318. The controller system 324 can be configured to use the one or more of the information about the first set of objects or the information about the second set of objects to determine an action to be performed by the other system 320. The action can be associated with a principal purpose of the other system 320. For example, if the other system 320 is an autonomous vehicle, then the action can be a determination of a trajectory for the autonomous vehicle. For example, the action may exclude one or more of an action associated with training the other system 320, an action associated with testing the other system 320, an action associated with repairing the other system 320, an action associated with performing maintenance on the other system 320, or the like.

In the implementation of the second configuration, the system 300 can be configured to perform, in iterations, a set of instructions. The set of instructions can include: (1) the instructions to cause the neural network 302 to determine the first set of objects, (2) the instructions to cause the other object detection system 314 to determine the second set of objects, (3) the instructions to compare the first count and the second count, (4) the instructions to designate, in response to the first count being different from the second count, the second set as the data set to train the neural network 302 for object detection, and (5) the instructions to cause the one or more of the information about the first set of objects or the information about the second set of objects to be conveyed to the controller system 324.

For example, in a first adaptation of the implementation of the second configuration, the data, produced by the ranging sensor system 312, comprise a set of data. The set of data can include subsets. Data in a subset, of the subsets, can be associated with a reading of the ranging sensor system 312.

FIGS. 4A and 4B include a set of tables 400 that illustrate an example a set of data produced by a ranging sensor system, according to the disclosed technologies. With reference to FIGS. 1-3, 4A, and 4B, for example, the set of data can be the set of data associated with the points 200 of the readings produced by the ranging sensor system 312. For example, the set of tables 400 can include a table for each subset, which can be associated with a point of a reading of the ranging sensor system 312: Point #1 through Point #60. For example, data for a subset (i.e., a point) can include: (1) data 402 for the distance ($\rho$) between the multi-line lidar device 116 and the point, (2) data 404 for the degree of angular rotation ($\varphi$) with respect to the ray 118, (3) data 406 for the height (z) above the ground plane, and (4) data 408 for a line of the multi-line lidar device 116 that produced the other data for the subset (i.e., the point).

Returning to FIG. 3, in the first adaptation of the implementation of the second configuration, the memory 306 can further store a data set preparation module 326. The data set preparation module 326 can include instructions that function to control the processor 304 to prevent one or more specific subsets, of the subsets, from being included in a performance in an iteration, of the iterations of the set of instructions, so that the performance can be completed within a duration of time of the iteration of the iterations of the set of instructions. For example, a ranging sensor system that includes a 128-line lidar device can produce, in a duration of time associated with a complete rotation of the 128-line lidar device, about 200,000 readings of points. If the other system 320 is an automated vehicle, then such a large number of readings of points may preclude an ability of the perception system 316 to detect objects so that a duration of time of an iteration of operations performed by the controller system 324 can be sufficiently short to support operations of the automated vehicle.

For example, in a first variation of the first adaptation of the implementation of the second configuration, the duration of time of the iteration, of the iterations of the set of instructions, can be less than or equal to one or more of: (1) a duration of time of an iteration of operations performed by the controller system 324, (2) a duration of time associated with a complete rotation of a ranging sensor of the ranging sensor system 312, or (3) the like. For example, if the other system 320 is an automated vehicle, then a duration of time of an iteration of the operations performed by the controller system 324 may be 100 milliseconds. For example, a duration of time associated with a complete rotation, at a rate of 10 Hz, of a ranging sensor of the ranging sensor system 312 can be 100 milliseconds. For example, in a specific realization, the duration of time, of an iteration, of the iterations of the set of instructions, can be less than or equal to one half of the duration of time associated with the complete rotation of the ranging sensor (e.g., 50 milliseconds).

For example, in a second variation of the first adaptation of the implementation of the second configuration, the instructions to prevent the one or more specific subsets from being included in the performance in the iteration, of the iterations of the set of instructions, so that the performance can be completed within the duration of time of the iteration, of the iterations of the set of instructions, can include: (1) instructions to determine that the reading is associated with a ground plane or a sky and (2) instructions to include, in the one or more specific subsets, the subset associated with the reading.

With reference to FIGS. 1-3, 4A, and 4B, for example, the instructions to determine that the reading is associated with the ground plane can determine that, because the heights (z) above the ground plane for the readings associated with the third line 206 (i.e., Point #41 through Point #60) are less than or equal to one decimeter, these readings can be associated with the ground plane and can be included in the one or more specific subsets prevented from being included in a performance in an iteration, of the iterations of the set of instructions, so that the performance can be completed within a specific duration of time for the iteration of the iterations of the set of instructions. Additionally or alternatively, the instructions to determine that the reading is associated with the sky can determine that, because the distances (ρ) between the multi-line lidar device 116 and the points for the readings associated with the first line 202 (i.e., Point #1 through Point #20) are infinite, these readings can be associated with the sky and can be included in the one or more specific subsets prevented from being included in a performance in an iteration, of the iterations of the set of instructions, so that the performance can be completed within a specific duration of time for the iteration of the iterations of the set of instructions.

Returning to FIG. 3, for example, in a third variation of the first adaptation of the implementation of the second configuration, the data in the subset can include a distance between a point, associated with the reading, and a ranging sensor of the ranging sensor system. The instructions to prevent the one or more specific subsets from being included in the performance in the iteration, of the iterations of the set of instructions, so that the performance can be completed within the duration of time of the iteration, of the iterations of the set of instructions, can include: (1) instructions to define a first set of subsets of the subsets and (2) instructions to include, in the one or more specific subsets, a first percentage of the subsets included in the first set of subsets. The distance, included in each subset in the first set of subsets, can be between a first threshold distance and a second threshold distance.

With reference to FIGS. 1-3, 4A, and 4B, for example, if the first threshold distance is 20 meters, the second threshold distance is 30 meters, and the first percentage is 50 percent, then the instructions to define the first set of subsets can define the first set of subsets to include subsets associated with readings for Point #27 through Point #40. For example, the instructions to include, in the one or more specific subsets, the first percentage of the subsets included in the first set of subsets can include half of the subsets included in the first set of subsets that includes Point #27 through Point #40. That is, because a distance between 20 meters and 30 meters is relatively close to the multi-line lidar device 116, there may exist more readings than are necessary to determine objects at this distance such that half of the readings may be prevented from being included in a performance in an iteration, of the iterations of the set of instructions, so that the performance can be completed within a specific duration of time for the iteration of the iterations of the set of instructions. For example, Point #28, Point #30, Point #32, Point #34, Point #36, Point #38, and Point #40 (e.g., every second point in the series of points) can be included in the one or more specific subsets that are prevented from being included in a performance in an iteration, of the iterations of the set of instructions, so that the performance can be completed within a specific duration of time for the iteration of the iterations of the set of instructions.

Returning to FIG. 3, additionally, for example, in the third variation of the first adaptation of the implementation of the second configuration, the instructions to prevent the one or more specific subsets from being included in the performance in the iteration, of the iterations of the set of instructions, so that the performance can be completed within the duration of time of the iteration, of the iterations of the set of instructions, can further include: (1) instructions to define a second set of subsets, of the subsets and (2) instructions to include, in the one or more specific subsets, a second percentage of the subsets included in the second set of subsets. The second percentage can be different from the first percentage. The distance, included in each subset in the second set of subsets, being between a third threshold distance and a fourth threshold distance.

With reference to FIGS. 1-3, 4A, and 4B, for example, if the third threshold distance is 35 meters, the second threshold distance is 55 meters, and the second percentage is 33 percent, then the instructions to define the second set of subsets can define the second set of subsets to include subsets associated with readings for Point #21 through Point #26. For example, the instructions to include, in the one or more specific subsets, the second percentage of the subsets included in the second set of subsets can include one-third of the subsets included in the second set of subsets that includes Point #21 through Point #26. That is, because a distance between 35 meters and 55 meters is further from the multi-line lidar device 116 than the distance associated with the first set of subsets (i.e., 20 meters to 30 meters), although there may exist more readings than are necessary to determine objects at the distance associated with the second set of subsets (i.e., 35 meters to 55 meters), there may be fewer readings associated with objects at this distance than readings associated with objects at the distance associated with the first set of subsets (i.e., 20 meters to 30 meters). Therefore, although some of the readings associated with the objects at the distance associated with the second set of subsets (i.e., 35 meters to 55 meters) may be prevented from being included in a performance in an iteration, of the iterations of the set of instructions, so that the performance can be completed within a specific duration of time for the iteration of the iterations of the set of instructions, the percentage of such readings included in the one or more specific subsets (e.g., 33 percent) can be smaller than the percentage of readings included in the one or more specific subsets for the first set of subsets (e.g., 50 percent). For example, Point #23 and Point #26 (e.g., every third point in the series of points) can be included in the one or more specific subsets that are prevented from being included in a performance in an iteration, of the iterations of the set of instructions, so that the performance can be completed within a specific duration of time for the iteration of the iterations of the set of instructions.

Returning to FIG. 3, for example, in a second adaptation of the implementation of the second configuration, a first phase can be associated with a duration of time during which the neural network 302 is being trained. A second phase can be associated with a duration of time after the neural network 302 has been trained. The instructions to cause the one or more of the information about the first set of objects or the information about the second set of objects to be conveyed to the controller system 324 can include: (1) instructions to cause, during the first phase, the information about the second set of objects to be conveyed to the controller system 324, (2) instructions to prevent, during the first phase, the information about the first set of objects from being conveyed to the controller system 324, and (3) instructions to cause, during the second phase, the one or more of the information about the first set of objects or the information about the second set of objects to be conveyed to the controller system 324.

For example, in a first variation of the second adaptation of the implementation of the second configuration, the instructions to cause, during the second phase, the one or more of the information about the first set of objects or the information about the second set of objects to be conveyed to the controller system 324 can further include: (a) instructions to cause, during the second phase, the information about the first set of objects to be conveyed to the controller system 324 and (b) instructions to prevent, during the second phase, the information about the second set of objects from being conveyed to the controller system 324.

For example, in a second variation of the second adaptation of the implementation of the second configuration, one or more of an end of the first phase or a beginning of the second phase can occur at a time at which one or more criteria are satisfied. For example, the one or more criteria can include one or more of a first time, a second time, a third time, or the like.

For example, the first time can be a time at which the duration of time, associated with the first phase, is greater than a threshold duration. For example, if the threshold duration is 30 days, then the one or more of the end of the first phase or the beginning of the second phase can occur 30 days after a beginning of the first phase.

For example, the second time can be associated with an end of a first later iteration, of the iterations of the set of instructions, in a first situation in which: (1) in a first earlier iteration of the iterations of the set of instructions: (a) the first set of objects and the second set of objects are produced at a specific location and (b) the first count is different from the second count and (2) in the first later iteration: (a) the first set of objects and the second set of objects are produced at the specific location and (b) the first count is equal to the second count. With reference to FIGS. 1 and 3, for example, if the other system 320 is the automated vehicle 112 and in the first earlier iteration at the specific location the first count (i.e., 2) is different from the second count (i.e., 3), but in the first later iteration at the specific location the first count (i.e., 3) is equal to the second count (i.e., 3), then the one or more of the end of the first phase or the beginning of the second phase can occur at the end of the first later iteration.

Returning to FIG. 3, for example, the third time can be associated with an end of a second later iteration, of the iterations of the set of instructions, in a second situation in which: (1) in a second earlier iteration, of the iterations of the set of instructions, the first count is equal to the second count, (2) in the second later iteration, the first count is equal to the second count, (3) in all intervening iterations between the second earlier iteration and the second later iteration, the first count is equal to the second count, and (4) a count of iterations, of the second earlier iteration, the second later iteration, and all the intervening iterations, is greater than a threshold count. For example, if: (1) the threshold count is three, (2) in the second earlier iteration the first count is equal to the second count, (3) in the second later iteration the first count is equal to the second count, (4) there are only two intervening iterations between the second earlier iteration and the second later iteration, (5) in a first intervening iteration, between the second earlier iteration and the second later iteration, the first count is equal to the second count, and (6) in a second intervening iteration, between the second earlier iteration and the second later iteration, the first count is equal to the second count, then, because the count of iterations, of the second earlier iteration, the second later iteration, and all the intervening iterations (i.e., 4), is greater than the threshold count (i.e., 3), the one or more of the end of the first phase or the beginning of the second phase can occur at the end of the second later iteration.

Figure 5:
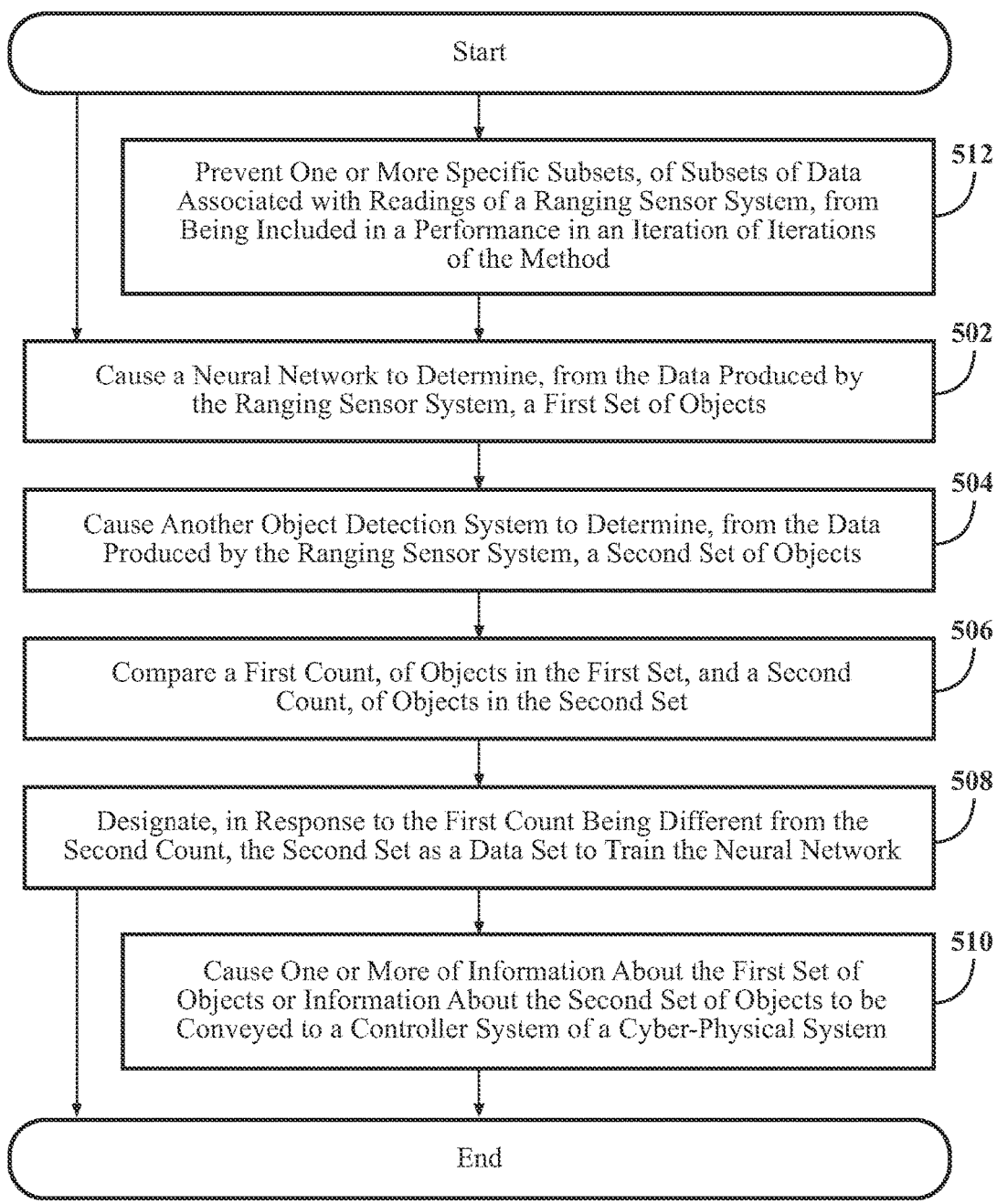
FIG. 5 includes a flow diagram that illustrates an example of a method that is associated with contemporaneously producing a data set to train a neural network for object detection, according to the disclosed technologies.

FIG. 5 includes a flow diagram that illustrates an example of a method 500 that is associated with contemporaneously producing a data set to train a neural network for object detection, according to the disclosed technologies. Although the method 500 is described in combination with the system 300 illustrated in FIG. 3, one of skill in the art understands, in light of the description herein, that the method 500 is not limited to being implemented by the system 300 illustrated in FIG. 3. Rather, the system 300 illustrated in FIG. 3 is an example of a system that may be used to implement the method 500. Additionally, although the method 500 is illustrated as a generally serial process, various aspects of the method 500 may be able to be executed in parallel.

In FIG. 5, in the method 500, at an operation 502, for example, the object detection module 308 can cause the neural network 302 to determine, from data, produced by a ranging sensor system 312, a first set of objects. The ranging sensor system 312 can include, for example, one or more of a lidar device, a radar device, an ultrasonic ranging device, an infrared ranging device, or the like. For example, the lidar device can include a multi-line lidar device. For example, the data, produced by the ranging sensor system 312, can include point cloud data.

At an operation 504, for example, the object detection module 308 can cause another object detection system 314 to determine, from the data, produced by the ranging sensor system 312, a second set of objects. For example, the other object detection system 314 can be configured to operate in a manner that excludes a performance of a function by an artificial neuron. That is, the other object detection system can exclude a neural network. For example, the other object detection system 314 can be configured to operate in a manner that includes a performance of functions that detect objects using a clustering technique. For example, the clustering technique can include a three-dimensional Euclidean clustering technique.

In a first configuration, the operation 502 can be performed in parallel with the operation 504.

At an operation 506, for example, the data set determination module 310 can compare a first count, of objects in the first set, and a second count, of objects in the second set.

At an operation 508, for example, the data set determination module 310 can designate, in response to the first count being different from the second count, the second set as the data set to train the neural network 302 for object detection. For example, the neural network 302 can include a self-supervised neural network.

In a second configuration, operations of the method 500 can be performed by a perception system 316 of a cyber-physical system 318. A cyber-physical system can be a computer system configured to monitor and/or control a mechanism in a manner in which one or more interactions between the computer system and one or more physical elements of the mechanism can account for different behavioral modalities and/or different contexts. The cyber-physical system 318 can being a component of another system 320. For example, the other system 320 can include one or more of a medical monitoring system, an electrical grid monitoring system, an industrial control system, a robotics system, an automated vehicle, or the like. For example, the automated vehicle can include an autonomous vehicle. For example, the other system 320 can have a housing and at least a portion of the cyber-physical system 318 can be disposed within the housing. Alternatively, for example, the other system 320 can have a housing and at least a portion of the cyber-physical system 318 can be disposed outside of the housing.

In an implementation of the second configuration, at an operation 510, for example, the communications module 322 can cause one or more of information about the first set of objects or information about the second set of objects to be conveyed to a controller system 324 of the cyber-physical system 318. The controller system 324 can be configured to use the one or more of the information about the first set of objects or the information about the second set of objects to determine an action to be performed by the other system 320. The action can be associated with a principal purpose of the other system 320. For example, if the other system 320 is an autonomous vehicle, then the action can be a determination of a trajectory for the autonomous vehicle. For example, the action may exclude one or more of an action associated with training the other system 320, an action associated with testing the other system 320, an action associated with repairing the other system 320, an action associated with performing maintenance on the other system 320, or the like.

In the implementation of the second configuration, the operation 502, the operation 504, the operation 506, the operation 508, and the operation 510 can be performed in iterations.

For example, in a first adaptation of the implementation of the second configuration, the data, produced by the ranging sensor system 312, comprise a set of data. The set of data can include subsets. Data in a subset, of the subsets, can be associated with a reading of the ranging sensor system 312.

In the first adaptation of the implementation of the second configuration, at an operation 512, for example, a data set preparation module 326 can prevent one or more specific subsets, of the subsets, from being included in a performance in an iteration, of the iterations of the method 500, so that the performance can be completed within a duration of time of the iteration of the iterations of the method 500.

For example, in a first variation of the first adaptation of the implementation of the second configuration, the duration of time of the iteration, of the iterations of the method 500, can be less than or equal to one or more of: (1) a duration of time of an iteration of operations performed by the controller system 324, (2) a duration of time associated with a complete rotation of a ranging sensor of the ranging sensor system 312, or (3) the like. For example, in a specific realization, the duration of time, of an iteration, of the iterations of the set of instructions, can be less than or equal to one half of the duration of time associated with the complete rotation of the ranging sensor.

For example, in a second variation of the first adaptation of the implementation of the second configuration, the operation 512 can include: (1) determining that the reading is associated with a ground plane or a sky and (2) including, in the one or more specific subsets, the subset associated with the reading.

For example, in a third variation of the first adaptation of the implementation of the second configuration, the data in the subset can include a distance between a point, associated with the reading, and a ranging sensor of the ranging sensor system. The operation 512 can include: (1) defining a first set of subsets of the subsets and (2) including, in the one or more specific subsets, a first percentage of the subsets included in the first set of subsets. The distance, included in each subset in the first set of subsets, can be between a first threshold distance and a second threshold distance.

Additionally, for example, in the third variation of the first adaptation of the implementation of the second configuration, the operation 512 can further include: (1) defining a second set of subsets of the subsets and (2) including, in the one or more specific subsets, a second percentage of the subsets included in the second set of subsets. The second percentage can be different from the first percentage. The distance, included in each subset in the second set of subsets, being between a third threshold distance and a fourth threshold distance.

In a second adaptation of the implementation of the second configuration, a first phase can be associated with a duration of time during which the neural network 302 is being trained. A second phase can be associated with a duration of time after the neural network 302 has been trained. The operation 510 can include: (1) causing, during the first phase, the information about the second set of objects to be conveyed to the controller system 324, (2) preventing, during the first phase, the information about the first set of objects from being conveyed to the controller system 324, and (3) causing, during the second phase, the one or more of the information about the first set of objects or the information about the second set of objects to be conveyed to the controller system 324.

For example, in a first variation of the second adaptation of the implementation of the second configuration, causing, during the second phase, the one or more of the information about the first set of objects or the information about the second set of objects to be conveyed to the controller system 324 can further include: (a) causing, during the second phase, the information about the first set of objects to be conveyed to the controller system 324 and (b) preventing, during the second phase, the information about the second set of objects from being conveyed to the controller system 324.

For example, in a second variation of the second adaptation of the implementation of the second configuration, one or more of an end of the first phase or a beginning of the second phase can occur at a time at which one or more criteria are satisfied. For example, the one or more criteria can include one or more of a first time, a second time, a third time, or the like.

For example, the first time can be a time at which the duration of time, associated with the first phase, is greater than a threshold duration.

For example, the second time can be associated with an end of a first later iteration, of the iterations of the method 500, in a first situation in which: (1) in a first earlier iteration of the iterations of the method 500: (a) the first set of objects and the second set of objects are produced at a specific location and (b) the first count is different from the second count and (2) in the first later iteration: (a) the first set of objects and the second set of objects are produced at the specific location and (b) the first count is equal to the second count.

For example, the third time can be associated with an end of a second later iteration, of the iterations of the method 500, in a second situation in which: (1) in a second earlier iteration, of the iterations of the method 500, the first count is equal to the second count, (2) in the second later iteration, the first count is equal to the second count, (3) in all intervening iterations between the second earlier iteration and the second later iteration, the first count is equal to the second count, and (4) a count of iterations, of the second earlier iteration, the second later iteration, and all the intervening iterations, is greater than a threshold count.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-3, 4A, 4B, and 5, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing:
an object detection module including instructions that, when executed by the processor, cause the processor to:
cause a neural network to determine, from data, produced by a ranging sensor system, a first set of objects; and
cause another object detection system to determine, from the data, a second set of objects; and
a data set determination module including instructions that, when executed by the processor, cause the processor to:
compare a first count, of objects in the first set, and a second count, of objects in the second set;
designate, in response to the first count being different from the second count, the second set as a data set to train the neural network for object detection, wherein the first count being different from the second count is indicative of an error in object detection by the neural network; and
train the neural network with the data set.

2. The system of claim 1, wherein the ranging sensor system comprises at least one of a lidar device, a radar device, an ultrasonic ranging device, or an infrared ranging device.

3. The system of claim 1, wherein the other object detection system is configured to operate in a manner that excludes a performance of a function by an artificial neuron.

4. The system of claim 1, wherein the other object detection system is configured to operate in a manner that includes a performance of functions that detect objects using a clustering technique.

5. The system of claim 1, wherein instructions of the system are configured to be performed by a perception system of a cyber-physical system, the cyber-physical system being a component of another system.

6. The system of claim 5, wherein the other system comprises at least one of a medical monitoring system, an electrical grid monitoring system, an industrial control system, a robotics system, or an automated vehicle.

7. The system of claim 5, wherein the other system has a housing, and at least a portion of the cyber-physical system is disposed within the housing.

8. The system of claim 5, wherein the other system has a housing, and at least a portion of the cyber-physical system is disposed outside of the housing.

9. The system of claim 5, wherein:
the memory further stores a communications module including instructions that, when executed by the processor, cause the processor to cause at least one of information about the first set of objects or information about the second set of objects to be conveyed to a controller system of the cyber-physical system,
the controller system is configured to use the at least one of the information about the first set of objects or the information about the second set of objects to determine an action to be performed by the other system, the action being associated with a principal purpose of the other system, and
the system is configured to perform, in iterations, a set of instructions, the set of instructions including:
the instructions to cause the neural network to determine the first set of objects,
the instructions to cause the other object detection system to determine the second set of objects,
the instructions to compare the first count and the second count,
the instructions to designate, in response to the first count being different from the second count, the second set as the data set to train the neural network for object detection, and
the instructions to cause the at least one of the information about the first set of objects or the information about the second set of objects to be conveyed to the controller system.

10. The system of claim 9, wherein:
the data, produced by the ranging sensor system, comprise a set of data, the set of data comprising subsets, data in a subset, of the subsets, being associated with a reading of the ranging sensor system, and
the memory further stores a data set preparation module including instructions that, when executed by the processor, cause the processor to prevent at least one specific subset, of the subsets, from being included in a performance in an iteration, of the iterations of the set of instructions, so that the performance is completed within a duration of time of the iteration of the iterations of the set of instructions.

11. The system of claim 10, wherein the duration of time of the iteration, of the iterations of the set of instructions, is less than or equal to at least one of:
a duration of time of an iteration of operations performed by the controller system, or
a duration of time associated with a complete rotation of a ranging sensor of the ranging sensor system.

12. The system of claim 10, wherein the instructions to prevent the at least one specific subset from being included in the performance in the iteration, of the iterations of the set of instructions, so that the performance is completed within the duration of time of the iteration, of the iterations of the set of instructions, include:
instructions to determine that the reading is associated with a ground plane or a sky; and
instructions to include, in the at least one specific subset, the subset associated with the reading.

13. The system of claim 10, wherein:
the data in the subset include a distance between a point, associated with the reading, and a ranging sensor of the ranging sensor system, and
the instructions to prevent the at least one specific subset from being included in the performance in the iteration, of the iterations of the set of instructions, so that the performance is completed within the duration of time of the iteration, of the iterations of the set of instructions, include:
instructions to define a first set of subsets, of the subsets, the distance, included in each subset in the first set of subsets, being between a first threshold distance and a second threshold distance; and
instructions to include, in the at least one specific subset, a first percentage of the subsets included in the first set of subsets.

14. The system of claim 13, wherein the instructions to prevent the at least one specific subset from being included in the performance in the iteration, of the iterations of the set of instructions so that the performance is completed within the duration of time of the iteration, of the iterations of the set of instructions, further include:
instructions to define a second set of subsets, of the subsets, the distance, included in each subset in the second set of subsets, being between a third threshold distance and a fourth threshold distance; and instructions to include, in the at least one specific subset, a second percentage of the subsets included in the second set of subsets, the second percentage being different from the first percentage.

15. The system of claim 9, wherein:

a first phase is associated with a duration of time during which the neural network is being trained, a second phase is associated with a duration of time after the neural network has been trained, and the instructions to cause the at least one of the information about the first set of objects or the information about the second set of objects to be conveyed to the controller system include:

instructions to cause, during the first phase, the information about the second set of objects to be conveyed to the controller system;

instructions to prevent, during the first phase, the information about the first set of objects from being conveyed to the controller system; and instructions to cause, during the second phase, the at least one of the information about the first set of objects or the information about the second set of objects to be conveyed to the controller system.

16. The system of claim 15, wherein the instructions to cause, during the second phase, the at least one of the information about the first set of objects or the information about the second set of objects to be conveyed to the controller system further include:

instructions to cause, during the second phase, the information about the first set of objects to be conveyed to the controller system; and instructions to prevent, during the second phase, the information about the second set of objects from being conveyed to the controller system.

17. The system of claim 15, wherein at least one of an end of the first phase or a beginning of the second phase occurs at a time at which at least one criterion is satisfied, the at least one criterion comprising at least one of:

a first time, the first time being a time at which the duration of time, associated with the first phase, is greater than a threshold duration, a second time, the second time being associated with an end of a first later iteration, of the iterations of the set of instructions, in a first situation in which:

in a first earlier iteration of the iterations of the set of instructions:
  the first set of objects and the second set of objects are produced at a specific location, and
  the first count is different from the second count, and
in the first later iteration:
  the first set of objects and the second set of objects are produced at the specific location, and
  the first count is equal to the second count, or a third time, the third time being associated with an end of a second later iteration, of the iterations of the set of instructions, in a second situation in which:

in a second earlier iteration, of the iterations of the set of instructions, the first count is equal to the second count, in the second later iteration, the first count is equal to the second count, in all intervening iterations between the second earlier iteration and the second later iteration, the first count is equal to the second count, and a count of iterations, of the second earlier iteration, the second later iteration, and the all intervening iterations, is greater than a threshold count.

18. A method, comprising:

causing, by a processor, a neural network to determine, from data, produced by a ranging sensor system, a first set of objects;

causing, by the processor, another object detection system to determine, from the data, a second set of objects;

comparing, by the processor, a first count, of objects in the first set, and a second count, of objects in the second set;

designating, by the processor and in response to the first count being different from the second count, the second set as a data set to train the neural network for object detection, wherein the first count being different from the second count is indicative of an error in object detection by the neural network; and training, by the processor, the neural network with the data set.

19. The method of claim 18, wherein:

the causing the neural network to determine the first set of objects is performed in parallel with the causing the other object detection system to determine the second set of objects.

20. A non-transitory computer-readable medium for producing a data set to train a neural network for object detection, the non-transitory computer-readable medium including instructions that, when executed by one or more processors, cause the one or more processors to:

cause a neural network to determine, from data, produced by a ranging sensor system, a first set of objects;

cause another object detection system to determine, from the data, a second set of objects;

compare a first count, of objects in the first set, and a second count, of objects in the second set;

designate, in response to the first count being different from the second count, the second set as a data set to train the neural network for object detection, wherein the first count being different from the second count is indicative of an error in object detection by the neural network; and train the neural network with the data set.

* * * * *